3,380,926
METHOD FOR PREPARING A EUROPI-
UM-ACTIVATED YTTRIUM VANADATE
PHOSPHOR
Stanley A. Harper, East Petersburg, Pa., assignor to Radio Corporation of America, a corporation of Delaware
No Drawing. Filed Jan. 18, 1965, Ser. No. 426,397
4 Claims. (Cl. 252—301.4)

This invention relates to an improved method for preparing a europium-activated yttrium vanadate phosphor which is particularly useful in kinescopes for color television.

Europium-activated yttrium vanadate phosphor and its preparation have been described previously in U.S. Patent No. 3,152,085 to A. A. Ballman et al. Such previous phosphor was particularly useful for producing coherent light upon excitation with visible and ultraviolet light of suitable intensity. Such use requires large crystals of suitable geometry and an optimization of the photoluminescence of the phosphor. Ballman et al. indicates that, during synthesis of the phosphor, a molten solution is formed of the initial mixture in which the concentrations are equivalent to 10 mol parts to 75 mol parts of the vanadate phosphor and 90 mol parts to 25 mol parts of the flux. On the basis of a constant quantity of phosphor, the flux concentration is in the range of 33 to 900 mol parts of flux per 100 mol parts of phosphor.

An object of this invention is to provide a method for preparing a europium-activated yttrium vanadate phosphor which is particularly adapted for use in cathode ray tubes, particularly kinescopes for color television. Such use calls for relatively small particles and an optimization of the cathodoluminescence of the phosphor.

In general, the method of the invention comprises, first, mixing the following ingredients in dry powdered form:

| | Mol parts |
|---|---|
| $Eu_2O_3$ | $a$ |
| $Y_2O_3$ | $100-a$ |
| $V_2O_5$ | $100+b$ |
| $Na_2CO_3$ | $(1.2 \text{ to } 2.8)b$ | where $a$ is between 2 and 9 and $b$ is between 5 and 30. The value $b$ indicates the molar excess of $V_2O_5$ over what is necessary to react to form the phosphor. This excess is available to react with the $Na_2CO_3$ to form the flux. In this formulation, the value of $b$ indicates also the mol parts of flux per 100 mol parts of phosphor, regardless of the proportion of $Na_2CO_3$ to excess of $V_2O_5$.

This mixture is heated in air at temperatures between 1150 and 1350° C. for between 1 and 4 hours. The heated mixture is cooled to room temperature, and then, washed to remove soluble material from the phosphor.

The object of the invention is achieved by reducing the proportion of flux from the Ballman et al. stated minimum of 33 mol parts per 100 parts of phosphor to 5 to 30 mol parts of flux per 100 mol parts of phosphor. Because of the reduced proportion of flux, unlike in the Ballman et al. method, a molten solution is not formed during the heating step. Instead, a solid state reaction takes place which produces phosphor particles of markedly smaller average size and having a useful cathodoluminescent brightness.

Further improvements in the brightness of the product may be achieved by washing the $V_2O_5$ raw material to be used in aqueous nitric acid for about 1 hour, then filtering, rinsing the $V_2O_5$ with water, and drying.

Example.—Stir about 100 grams of chemically-pure $V_2O_5$ (vanadium pentoxide) powder in about 200 cc. of 35% nitric acid in water for about 1 hour. Then, filter the acid-washed $V_2O_5$ powder, rinse the powder with water, and then dry the powder.

Next, mix the following ingredients in a dry powdered form in about the indicated proportions:

| | Mol parts |
|---|---|
| $Eu_2O_3$ (8.0 grams) | 5 |
| $Y_2O_3$ (100 grams) | 95 |
| $V_2O_5$ (acid washed) (93 grams) | 110 |
| $Na_2CO_3$ (9.0 grams) | 18 |

The dry mixture is then placed in a quartz crucible. The crucible is heated in air at about 1250° C. for about 2 hours in a furnace, and is then removed from the furnace to a room temperature ambient. When the material has cooled, the material is removed from the crucible and washed with warm water to dissolve soluble materials, leaving behind a powder having the approximate molar composition $Y_{0.95}Eu_{0.05}VO_4$. This material exhibits a red cathodoluminescence which has its principal spectral emission lines at about 6150 and 6190 A., and a visual brightness of about 65 relative to P1 phosphor as standardized by the Joint Electron Devices Engineering Council. The material has good chemical stability with respect to the processes used commercially for fabricating luminescent screens for color television kinescopes. Also, the material has a particle size predominantly in the range between 1 and 15 microns, which is desirable for such screen fabrication processes.

The step of acid-washing the $V_2O_5$ may be omitted entirely. In such case, using the procedure of the example, the visual brightness of the material is slightly lower being about 60 relative to the standard P1 phosphor.

The proportion of flux may be varied in the narrow range of 5 to 30 mol parts per hundred parts of $Y_2O_3$ plus $Eu_2O_3$, but is preferably about 10 mol parts. The preferred ratio of $Na_2CO_3$ to the excess of $V_2O_5$ (the value $b$) is about 1.9, although this ratio can be varied between 1.2 and 2.8.

The object of the invention is achieved at least by the reduction of the proportion of total flux to a lower concentration range and by using a flux composition containing some sodium pyrovanadate. Such reduction in total flux concentration provides a product after firing which is readily friable, easily removed from the firing crucibles and washed. Of equal importance, the lower flux concentrations result in a marked reduction in the average particle size of the phosphor, thereby providing a useful phosphor material for application in cathodoluminescent screens.

The following theory is presented to aid in understanding the invention and is not intended to limit the invention.

In the Ballman et al. patent, the flux for the growth of rare earth orthovanadate phosphor is described as either sodium metavanadate or sodium orthovanadate or mixtures thereof. With the flux proportions used in the present invention, when only sodium metavanadate was used as a flux, a brown discolored product is obtained upon heating. The brown material was found to contain unreacted $V_2O_5$ and occurred even though all the components in the reaction were carefully proportioned. It is believed that the flux in the present invention not only promotes the reaction and crystallization of the product but serves also to compensate or correct localized inhomogeneities in the composition of the mixture.

The chemical formulas of the three sodium vanadates used in the following discussion are:

(meta-) $Na_2O \cdot V_2O_5$ or $2NaVO_3$
(pyro-) $2Na_2O \cdot V_2O_5$ or $Na_4V_2O_7$
(ortho-) $3Na_2O \cdot V_2O_5$ or $2Na_3VO_4$ In the synthesis of the cathodoluminescent phosphors, described herein, the flux composition has a ratio of $Na_2CO_3$ to excess $V_2O_5$ such that sodium pyrovanadate is formed. This range is shown in the dry mixture formula above as 1.2 to 2.8 mol parts $Na_2CO_3$ per mol part of excess $V_2O_5$.

The dry mixing of components for synthesis usually results in localized inhomogeneities which requires considerable diffusion of some of the reactants in order to achieve a homogeneous product. With very high flux concentrations (more than 33 parts per 100 parts phosphor) which may be used for growing large crystals, a fluid molten solution is obtained during heating which allows a uniform distribution of the reaction components to be obtained rapidly by convection mixing as well as by diffusion. When a lower flux concentration is used, as in the present invention, the heated mixture is not a molten fluid solution, even though all the high melting constituents may be wetted with the flux. Localized excesses of $V_2O_5$, for example, do not diffuse rapidly enough during the time of heating to become uniformly distributed. This may be the cause of the discolored product when sodium metavanadate alone is used as a flux. When a similar synthesis is performed in which some sodium pyrovanadate flux is present, the final product is essentially white in color and is an efficient cathodoluminescent phosphor. The action of the sodium pyrovanadate in correcting localized excesses of $V_2O_5$, $Y_2O_3$, and/or $Eu_2O_3$ may occur through the following chemical reactions:

(1) $3Na_4V_2O_7 + Eu_2O_3 \rightarrow 2EuVO_4 + 4Na_3VO_4$
(2) $3Na_4V_2O_7 + Y_2O_3 \rightarrow 2YVO_4 + 4Na_3VO_4$
(3) $Na_4V_2O_7 + V_2O_5 \rightarrow 4NaVO_3$ If a local excess $Y_2O_3$ or $Eu_2O_3$ is present, the pyro vanadate flux can react with it forming the desired europium or yttrium orthovanadate and some sodium orthovanadate, as in Equation 1 or 2. If a local excess $V_2O_5$ is present, the pyrovanadate flux can react with it forming some sodium metavanadate flux, as in Equation 3. At the conclusion of the heating, the flux composition may vary continuously throughout the heated charge depending on the local inhomogeneities which were corrected by the flux. A flux of pure sodium metavanadate or pure sodium orthovanadate alone would be incapable of correcting both types of excesses as shown in the equations.

During synthesis a flux containing sodium pyrovanadate can "correct" minor errors in weighing of the components for the dry mixture. This is particularly important in commercial production of the phosphor.

What is claimed is:
1. A method for preparing a europium-activated yttrium vanadate phosphor comprising:
   (1) providing a low flux concentration mixture which upon heating betwen 1150° C. and 1350° C. does not form a molten fluid solution by mixing the following ingredients in dry powdered form in the indicated proportions:

| | Mol parts |
|---|---|
| $Eu_2O_3$ | $a$ |
| $Y_2O_3$ | $100-a$ |
| $V_2O_5$ | $100+b$ |
| $Na_2CO_3$ | (1.2 to 2.8) $b$ | where $a$ is between 2 and 9, and $b$ is between 5 and 30,
   (2) heating said mixture in air at temperatures between 1150 and 1350° C. for between 1 and 4 hours,
   (3) cooling said heated mixture to room temperature, and then
   (4) washing said cooled mixture.

2. A method for preparing a europium-activated yttrium vanadate phosphor comprising:
   (1) providing a low flux concentration mixture which upon heating between 1150° C. and 1350° C. does not form a molten fluid solution by mixing the following ingredients in dry powdered form in the indicated proportions:

| | Mol parts |
|---|---|
| $Eu_2O_3$ | $a$ |
| $Y_2O_3$ | $100-a$ |
| $V_2O_5$ | $100+b$ |
| $Na_2CO_3$ | (1.2 to 2.8) $b$ | where $a$ is about 5, and $b$ is about 10,
   (2) heating said mixture in air at temperatures between 1150 and 1350° C. for between 1 and 4 hours,
   (3) rapidly cooling said heated mixture to room temperature, and then
   (4) washing said cooled mixture to remove soluble material from said phosphor.

3. A method for preparing a europium-activated yttrium vanadate phosphor comprising:
   (1) washing a quantity of powdered $V_2O_5$ in aqueous nitric acid,
   (2) drying said acid-washed $V_2O_5$,
   (3) providing a low flux concentration mixture which upon heating between 1150° C. and 1350° C. does not form a molten fluid solution by mixing the following ingredients in dry powdered form in the indicated proportions:

| | Mol parts |
|---|---|
| $Eu_2O_3$ | $a$ |
| $Y_2O_3$ | $100-a$ |
| $V_2O_5$ (said acid-washed) | $100+b$ |
| $Na_2CO_3$ | (1.2 to 2.8) $b$ | where $a$ is between 2 and 9, and $b$ is between 5 and 30,
   (4) heating said mixture in air at temperatures between 1150 and 1350° C. for between 1 and 4 hours,
   (5) cooling said heated mixture to room temperature, and then
   (6) washing said cooled mixture to remove soluble material from said phosphor.

4. A method for preparing a europium-activated yttrium vanadate phosphor comprising:
   (1) washing a quantity of powdered chemically pure $V_2O_5$ in aqueous nitric acid for about 1 hour,
   (2) drying said acid-washed $V_2O_5$,
   (3) providing a low flux concentration mixture which upon heating between 1150° C. and 1350° C. does not form a molten fluid solution by mixing the following ingredients in dry powdered form in the indicated proportions:

| | Mol parts |
|---|---|
| $Eu_2O_3$ | $a$ |
| $Y_2O_3$ | $100-a$ |
| $V_2O_5$ (said acid-washed) | $100+b$ |
| $Na_2CO_3$ | (1.2 to 2.8) $b$ | where $a$ is about 5, and $b$ is about 10,
   (4) heating said mixture in air at temperatures between 1150 and 1350° C. for between 1 and 4 hours,
   (5) rapidly cooling said heated mixture to room temtemperature, and then
   (6) washing said cooled mixture to remove soluble material from said phosphor.

References Cited
UNITED STATES PATENTS

| 3,152,085 | 10/1964 | Ballman et al. | 252—301.4 |
| 3,250,722 | 5/1966 | Borchardt | 252—301.4 |
| 3,301,791 | 1/1967 | Brixner | 252—301.4 |

OTHER REFERENCES

Brixner et al., "On the Luminescent Properties of the Rare Earth Vanadates," Journal of the Electrochemical Society, vol. 112, No. 1, January 1965, pp. 70–74 and the cover.

TOBIAS E. LEVOW, Primary Examiner.

ROBERT D. EDMONDS, Examiner.